US008364579B2

(12) United States Patent
Hu et al.

(10) Patent No.: US 8,364,579 B2
(45) Date of Patent: *Jan. 29, 2013

(54) ONLINE SYSTEM FOR FULFILLING LOAN APPLICATIONS FROM LOAN ORIGINATORS

(75) Inventors: Limin Hu, Fremont, CA (US); Babak Khanpour, West Hills, CA (US); Ting-Hu Wu, Fremont, CA (US)

(73) Assignee: Ellie Mae, Inc., Pleasanton, CA (US)

( * ) Notice: Subject to any disclaimer, the term of this patent is extended or adjusted under 35 U.S.C. 154(b) by 860 days.

This patent is subject to a terminal disclaimer.

(21) Appl. No.: 12/259,247

(22) Filed: Oct. 27, 2008

(65) Prior Publication Data

US 2009/0055309 A1 Feb. 26, 2009

Related U.S. Application Data

(63) Continuation of application No. 10/172,844, filed on Jun. 14, 2002, now Pat. No. 7,444,302.

(51) Int. Cl.
*G06Q 40/00* (2012.01)

(52) U.S. Cl. .......................................................... 705/38

(58) Field of Classification Search ................ 705/38–42
See application file for complete search history.

(56) References Cited

U.S. PATENT DOCUMENTS

| 5,091,868 A | 2/1992 | Pickens et al. |
| 5,111,185 A | 5/1992 | Kozaki |
| 5,144,693 A | 9/1992 | Morgan |
| 5,148,520 A | 9/1992 | Morgan |
| 5,191,525 A | 3/1993 | LeBrun et al. |
| 5,226,137 A | 7/1993 | Bolan et al. |
| 5,438,657 A | 8/1995 | Nakatani |
| 5,581,700 A | 12/1996 | Witte |
| 5,611,052 A | 3/1997 | Dykstra et al. |
| 5,699,527 A | 12/1997 | Davidson |
| 5,704,029 A | 12/1997 | Wright, Jr. |
| 5,734,898 A | 3/1998 | He |
| 5,752,042 A | 5/1998 | Cole et al. |
| 5,765,144 A | 6/1998 | Larche et al. |
| 5,768,510 A | 6/1998 | Gish |
| 5,774,551 A | 6/1998 | Wu et al. |
| 5,812,764 A | 9/1998 | Heinz, Sr. |
| 5,913,029 A | 6/1999 | Shostak |
| 5,919,247 A | 7/1999 | Van Hoff et al. |
| 5,940,812 A | 8/1999 | Tengel et al. |
| 5,963,952 A | 10/1999 | Smith |
| 5,995,947 A | 11/1999 | Fraser et al. |

(Continued)

FOREIGN PATENT DOCUMENTS

WO    WO 00/21011    4/2000

OTHER PUBLICATIONS

Mguill, "Genesis 2000 TechNet" Internet Publication, (Online) Jan. 28, 2003. Retrieved from the Internet: URL:http://www.genesis2000.com/support/index3.asp.

Calyx Point—Getting Started (Updated Aug. 2002).

Gator eWallet—The Smart Online Companion, Feb. 24, 2006 (2 pages). Retrieved from the Internet: URL:http://www.gator.com/home2.html.

(Continued)

*Primary Examiner* — Hani M Kazimi (74) *Attorney, Agent, or Firm* — Fish & Richardson P.C.

(57) ABSTRACT

A loan submission and processing system, methods, apparatus and computer program products. One example method includes receiving user specified input relating to a loan application, storing the user specified input in a loan application file, determining a partner system that is to receive data related to the electronic loan application including dynamically determining a format and contents required to present a service request to the partner system for processing by the partner system, dynamically formatting the user specified input and any other required content into a service request, the service request compatible with the partner system and including the user specified data and the other required content and transmitting the service request to the partner system.

27 Claims, 9 Drawing Sheets

U.S. PATENT DOCUMENTS

| | | |
|---|---|---|
| 5,995,985 A | 11/1999 | Cai |
| 6,000,033 A | 12/1999 | Kelley et al. |
| 6,006,242 A | 12/1999 | Poole et al. |
| 6,006,334 A | 12/1999 | Nguyen et al. |
| 6,023,714 A | 2/2000 | Hill et al. |
| 6,029,149 A | 2/2000 | Dykstra et al. |
| 6,078,403 A | 6/2000 | Palmer |
| 6,081,893 A | 6/2000 | Grawrock et al. |
| 6,088,700 A | 7/2000 | Larsen et al. |
| 6,088,796 A | 7/2000 | Cianfrocca et al. |
| 6,092,121 A | 7/2000 | Bennett et al. |
| 6,101,510 A | 8/2000 | Stone et al. |
| 6,104,394 A | 8/2000 | Lisle et al. |
| 6,128,602 A | 10/2000 | Northington et al. |
| 6,154,751 A | 11/2000 | Ault et al. |
| 6,157,953 A | 12/2000 | Chang et al. |
| 6,175,926 B1 | 1/2001 | Fogle |
| 6,202,206 B1 | 3/2001 | Dean et al. |
| 6,208,979 B1 | 3/2001 | Sinclair |
| 6,209,095 B1 | 3/2001 | Anderson et al. |
| 6,226,623 B1 | 5/2001 | Schein et al. |
| 6,233,566 B1 | 5/2001 | Levine et al. |
| 6,233,582 B1 | 5/2001 | Traversat et al. |
| 6,266,716 B1 | 7/2001 | Wilson et al. |
| 6,282,658 B2 | 8/2001 | French et al. |
| 6,321,339 B1 | 11/2001 | French et al. |
| 6,324,524 B1 | 11/2001 | Lent et al. |
| 6,324,648 B1 | 11/2001 | Grantges, Jr. |
| 6,336,124 B1 | 1/2002 | Alam et al. |
| 6,338,064 B1 | 1/2002 | Ault et al. |
| 6,339,828 B1 | 1/2002 | Grawrock et al. |
| 6,341,351 B1 | 1/2002 | Muralidhran et al. |
| 6,351,776 B1 | 2/2002 | O'Brien et al. |
| 6,363,391 B1 | 3/2002 | Rosensteel, Jr. |
| 6,366,912 B1 | 4/2002 | Wallent et al. |
| 6,385,655 B1 | 5/2002 | Smith et al. |
| 6,397,337 B1 | 5/2002 | Garrett et al. |
| 6,418,448 B1 | 7/2002 | Sarkar |
| 6,424,968 B1 | 7/2002 | Broster et al. |
| 6,438,526 B1 | 8/2002 | Dykes et al. |
| 6,446,141 B1 | 9/2002 | Nolan et al. |
| 6,469,714 B2 | 10/2002 | Buxton et al. |
| 6,473,892 B1 | 10/2002 | Porter |
| 6,476,828 B1 | 11/2002 | Burket et al. |
| 6,476,833 B1 | 11/2002 | Moshfeghi |
| 6,477,537 B2 | 11/2002 | Gustman |
| 6,493,871 B1 | 12/2002 | McGuire et al. |
| 6,496,936 B1 | 12/2002 | French et al. |
| 6,504,554 B1 | 1/2003 | Stone et al. |
| 6,538,669 B1 | 3/2003 | Lagueux, Jr. et al. |
| 6,553,408 B1 | 4/2003 | Merrell et al. |
| 6,608,634 B1 | 8/2003 | Sherrard et al. |
| 6,611,816 B2 | 8/2003 | Lebda et al. |
| 6,615,405 B1 | 9/2003 | Goldman et al. |
| 6,640,278 B1 | 10/2003 | Nolan et al. |
| 6,662,340 B2 | 12/2003 | Rawat et al. |
| 6,851,087 B1 | 2/2005 | Sibert |
| 6,859,878 B1 | 2/2005 | Kerr et al. |
| 6,904,412 B1 | 6/2005 | Broadbent et al. |
| 6,920,434 B1 | 7/2005 | Cossette |
| 6,947,943 B2 | 9/2005 | DeAnna et al. |
| 7,058,971 B1 | 6/2006 | Horikiri |
| 7,103,650 B1 | 9/2006 | Vetrivelkumaran et al. |
| 7,155,490 B1 | 12/2006 | Malmer et al. |
| 7,165,250 B2 | 1/2007 | Lyons |
| 7,185,333 B1 | 2/2007 | Shafron |
| 7,263,663 B2 | 8/2007 | Ballard et al. |
| 7,340,714 B2 | 3/2008 | Upton |
| 7,343,348 B2 | 3/2008 | McAvoy et al. |
| 7,379,965 B2 | 5/2008 | Sherwood et al. |
| 2001/0010046 A1 | 7/2001 | Muyres et al. |
| 2001/0011246 A1 | 8/2001 | Tammaro |
| 2001/0029482 A1 | 10/2001 | Tealdi et al. |
| 2001/0032178 A1 | 10/2001 | Adams et al. |
| 2001/0037288 A1 | 11/2001 | Bennett et al. |
| 2001/0039516 A1 | 11/2001 | Bennett et al. |
| 2001/0047307 A1 | 11/2001 | Bennett et al. |
| 2001/0047326 A1 | 11/2001 | Broadbent et al. |
| 2001/0049653 A1 | 12/2001 | Sheets |
| 2002/0019804 A1 | 2/2002 | Sutton |
| 2002/0029188 A1 | 3/2002 | Schmid |
| 2002/0059137 A1 | 5/2002 | Freeman et al. |
| 2002/0065879 A1 | 5/2002 | Ambrose et al. |
| 2002/0138414 A1 | 9/2002 | Baker, IV |
| 2002/0188941 A1 | 12/2002 | Cicciarelli et al. |
| 2002/0194219 A1 | 12/2002 | Bradley et al. |
| 2003/0033241 A1 | 2/2003 | Harari |
| 2003/0046586 A1 | 3/2003 | Bheemarasetti et al. |
| 2003/0061398 A1 | 3/2003 | Wilson et al. |
| 2003/0065614 A1 | 4/2003 | Sweeney |
| 2003/0066065 A1 | 4/2003 | Larkin |
| 2003/0159136 A1 | 8/2003 | Huang et al. |
| 2003/0163598 A1 | 8/2003 | Wilson et al. |
| 2003/0184585 A1 | 10/2003 | Xu et al. |
| 2003/0210428 A1 | 11/2003 | Bevlin et al. |
| 2003/0229581 A1 | 12/2003 | Green et al. |
| 2003/0233316 A1 | 12/2003 | Hu et al. |
| 2004/0019558 A1 | 1/2004 | McDonald et al. |
| 2004/0034592 A1 | 2/2004 | Hu et al. |
| 2004/0088700 A1 | 5/2004 | Lee et al. |
| 2004/0138996 A1 | 7/2004 | Bettenburg et al. |
| 2004/0225596 A1 | 11/2004 | Kemper et al. |
| 2005/0172271 A1 | 8/2005 | Spertus et al. |
| 2005/0235202 A1 | 10/2005 | Chen et al. |
| 2005/0278249 A1 | 12/2005 | Jones et al. |
| 2005/0289046 A1 | 12/2005 | Conyack, Jr. |
| 2006/0005036 A1 | 1/2006 | Hu et al. |
| 2006/0075070 A1 | 4/2006 | Merissert-Coffinieres et al. |
| 2006/0101453 A1 | 5/2006 | Burkhart et al. |
| 2006/0155639 A1 | 7/2006 | Lynch et al. |
| 2006/0178983 A1 | 8/2006 | Nice et al. |
| 2006/0184452 A1 | 8/2006 | Barnes et al. |
| 2006/0248003 A1 | 11/2006 | Basin et al. |

OTHER PUBLICATIONS

Gator eWallet—Frequently Asked Questions, Feb. 24, 2006 (11 pages). Retrieved from the Internet: URL:http://www.gator.com/help/gatorfaq.html.
Point Installation (PN 801000-000737) (2 pages).
Contour Software, Inc.—The Loan Closer for Windows—Version 4.0 (1984-1998).
Contour Software, Inc.—The Loan Handler—Version 5.0 (1984-2001).
Ilium Software eWallet Users Guide and Reference Version 4.0 by Ilium Software, Inc. © 1997-2006.
Calyx Software, "Point for Windows Version 3.x Interface Development Guide," Nov. 29, 1999, pp. 1-21.
Calyx Software, "Point for Windows Version 3.x Interface Marketing Guide," Dec. 8, 1999, pp. 1-5.
LOS Documentation—Genesis (2001).
LOS Documentation—Calyx (2002).
Calyx Point—Getting Started (2002).
Calyx Point—Point User Guide (2002).
LOS Documentation—Byte (2003).
Calyx Point—Point User Guide (2003).
Calyx Point and PointMan—Getting Started Guide (2003).
LOS Documentation—Genesis (2004).
Understanding Client-Server Applications, Parts I and II, zone.ni.com, Feb. 19, 2004.
A Gentle Introduction to SGML, isgmlug.org, Apr. 14, 2004.
Overview of SGML Resources, W3.org., Apr. 14, 2004.
Application Service Provider, Webopedia, May 6, 2004.
How ASPs Work, howstuffworks.com, Jul. 1, 2004.
Defining an Internet ASP, howstuffworks.com, Jul. 1, 2004.
Examples of ASPs, howstuffworks.com, Jul. 1, 2004.
How ASPs Work, Things to Ask a Prospective ASP, howstuffworks.com, Jul. 1, 2004.
User's Guide to Gator eWallet Version 7.x, published by Gain Publishing (no publication date known).
Using MS Message Queue Triggers, Bradley Holland, consulting.dthomas.co.uk, date unknown.

CALCULATE PURCHASE POWER

FILE   EDIT   VIEW   PRINT   SEARCH                                                          HELP

PREQUALIFY

FIELDS MARKED WITH AN ASTERISK (*) ARE REQUIRED, OTHERS ARE OPTIONAL.

1.* HOUSEHOLD EMPLOYMENT INCOME:
   GROSS PAYCHECK $[         ]    [MONTHLY ⇕]
   SELF EMPLOYMENT INCOME IF APPLICABLE:
   2001 PROFIT FROM SCHEDULE C (LINE 29)            $[         ]
   2001 DEPRECIATION FROM SCHEDULE C (LINE 13)      $[         ]

2. OTHER REGULAR SOURCE OF INCOME (PENSION, DISABILITY, ALIMONY, CHILD SUPPORT), MONYHLY:
   NOTICE: ALIMONY, CHILD SUPPORT OR SEPARATE MAINTENANCE INCOME NEED NOT BE REVEALED IF THE BORROWER (B) OR CO-BORROWER (C) DOES NOT CHOOSE TO HAVE IT CONSIDERED FOR REPAYING OF THIS LOAN.     $[         ]

3. CAN YOU DOCUMENT YOUR INCOME THROUGH PAYSTUBS, W2'S, ETC.?
   ⦿ YES   ○ NO

4. HAVE YOU BEEN STEADILY EMPLOYED IN THE SAME LINE OF WORK FOR OVER TWO YEARS?
   ⦿ YES   ○ NO

5. PLEASE LIST MONTHLY PAYMENTS ON THE FOLLOWING:
   CAR: $[       ]   CREDIT CARD $[       ]   OTHER: $[       ]

6. HOW WOULD YOU RATE YOUR CREDIT?            [EXCELLENT ⇕]

7.* HOW MUCH CASH WILL BE AVAILABLE TO USE FOR DOWN PAYMENT AND CLOSING COSTS, ETC.? [◁ EXPLAIN]  $[       ]

8. HOW MUCH OF THAT AMOUNT WILL BE GIFT MONEY?   $[       ]

9. AFTER THE CLOSE OF THE TRANSACTION, HOW MUCH WILL YOU HAVE IN THE FOLLOWING ACCOUNTS:
   CHECKING: $[       ]   SAVINGS: $[       ]   OTHER: $[       ]

10.* IN WHAT REGION IS THE PROPERTY LOCATED?   [CALIFORNIA-NORTH ⇕]
11.* TYPE OF PROPERTY?                         [SINGLE FAMILY HOUSE ⇕]

[△ BACK TO TOP]

QUICK RATE CHECK

FILE   EDIT   VIEW   PRINT   SEARCH                                    HELP

SHOP RATES

⦿ TYPES OF LOANS    ⦿ IDEAL LOANS FOR YOUR LIFESTYLE

TIRED OF ADVERTISED LOANS THAT DON'T APPLY TO YOUR SITUATION? NOW YOU CAN QUICKLY DETERMINE TODAY'S RATES BASED ON HOW MUCH YOU WANT TO BORROW, THE VALUE, USAGE, AND TYPE OF THE PROPERTY, AND HOW YOU CHOOSE TO DOCUMENT YOUR INCOME.

FIELDS MARKED WITH AN ASTERISK (*) ARE REQUIRED, OTHERS OPTIONAL

1.* IN WHAT REGION IS THE PROPERTY LOCATED?  [CALIFORNIA-NORTH ⇕]
2.* TYPE OF PROPERTY? [SINGLE FAMILY HOUSE ⇕]
3.* YOUR PROPERTY USAGE:
    ⦿ HOME    ○ RENTAL    ○ VACATION
4.* PURPOSE OF LOAN:  [PURCHASE ⇕]
5.* THE LOAN AMOUNT:  $[        ]
6.* PROPERTY VALUE:   $[        ]

7. WILL YOU CONSIDER LOANS WITH A PREPAYMENT PENALTY?
   ○ YES    ⦿ NO                          [◁ EXPLAIN]

8. CAN YOU DOCUMENT YOUR INCOME THROUGH PAYSTUBS, W2'S, ETC.?
   ⦿ YES    ○ NO

9. PLEASE SELECT THE TYPE(S) OF LOAN(S) YOU WOULD LIKE TO SEE:
                                            [◁ EXPLAIN]
   ☐ 1 MONTH ARM     ☐ 6 MONTH ARM     ☐ 1 YEAR ARM
   ☐ 3 M ARM         ☐ 5 M ARM         ☐ 7 M ARM
   ☐ 10 M ARM        ☐ 15 YEAR FIXED   ☐ 20 YEAR FIXED
   ☐ 30 YEAR FIXED   ☐ 2M BUY DOWN

10. MINIMUM LOCK-IN PERIOD:    [NONE ⇕]
                        [◁ EXPLAIN]

[△ BACK TO TOP]

FIG. 7

ONLINE SYSTEM FOR FULFILLING LOAN APPLICATIONS FROM LOAN ORIGINATORS

CROSS-REFERENCE

This application is a continuation of U.S. application Ser. No. 10/172,844, entitled "Online System for Fulfilling Loan Applications from Loan Originators," filed on Jun. 14, 2002; and is related to U.S. application Ser. No. 10/222,637, entitled "Loan Origination System Interface for Online Loan Application Processing," filed on Aug. 15, 2002. The disclosures of said applications are incorporated herein by reference.

FIELD OF THE INVENTION

The present invention relates generally to computer networks, and more specifically, to a system for processing and fulfilling loan applications over a network.

BACKGROUND

The World Wide Web ("web") has evolved from first generation web systems that simply provided information to client computers over the Internet through a web browser program to second generation systems using application servers that provide dynamic, personalized information and powerful back-end transaction processing.

A great number of commercial applications become adapted to on-line systems, thus establishing a base of many different types of electronic commerce or "e-commerce" transactions. Among the various adaptations of classical commercial transactions that have become adapted to online implementations is the area of financial loans. The loan application process is often a complicated and confusing process for average borrowers.

There are a great many different types of loans available depending upon the type of loan required, such as personal loans, home mortgages, business lines of credit, and so on. There are also many different variables or negotiable terms associated with each loan, such as interest rate, loan period, processing fees, and the like. In most cases, a detailed profile of the borrower is required because factors such as age, employment, financial history, credit rating and so on, can have a great deal of impact on the cost and ability to qualify for a loan. Moreover, loans are available from many different sources, such as traditional banks to private and commercial money lenders.

Thus, the process of applying for and obtaining a loan can be complicated and time consuming because of the great number of variables regarding the loan, the lender, and the borrower, as well as the number of parties involved in the loan process. Because of the distributed, information-intensive nature of the loan industry, a class of loan brokers, also referred to as "loan originators," has emerged to aid borrowers in finding and obtaining the proper loan. The advent of loan originators has served to provide an important interface between borrowers and the various lenders and underwriters who might have an appropriate loan product.

Computer-based loan brokers typically use sophisticated programs, referred to as Loan Origination Software (LOS) systems, to automate the loan application process and fulfillment process. In a traditional loan application scenario, a borrower approaches a loan broker to find an appropriate loan. The broker takes the application information from the borrower and compiles a traditional loan application. Some type of loans provide standardized formats for the loan application information. For example, mortgage loan applicants and processors typically use a uniform mortgage application form to provide what is referred to as "1003" data, corresponding to FNMA (Fannie Mae) form number 1003. The loan broker then passes the application information to various other parties, such as loan underwriters, lenders, and settlement service vendors.

The widespread use of the Internet has generally led loan brokers to recognize and accept the Internet and computerized processes as viable and promising vehicles with which to conduct business. Traditional loan processing involves a great deal of customer support, data input, and expedited mailing and delivery of physical documents. These factors present areas of great cost and potential problems in the loan application, processing, and delivery transaction. Although most present loan originators have implemented software systems, such as LOS programs, to automate their processes, typical loan origination software systems do not provide a comprehensive interface between loan brokers and lenders, and other third parties, such as settlement services. Furthermore, most present loan origination systems do not provide comprehensive form and document completion processes that truly automates the loan application process and minimizes the errors associated with individually completing all of the separate forms required in a typical loan transaction.

What is needed, therefore, is a loan processing and submission system that provides comprehensive completion, control and submission of forms and documents associated with a loan application.

What is further needed is a loan processing system that provides a comprehensive network-based interface between a broker and a plurality of lenders and other third parties for fulfillment of a loan application on behalf of a borrower.

SUMMARY

An on-line interface system for facilitating the processing of loan applications by loan originators is described. A processing and submission system receives relevant loan information from a borrower and enters this information into file templates, which are utilized during loan origination. An automatic data flow process accessible through an origination screen populates the relevant fields in all of the other loan forms and word processing documents. Forms are supported for several different loan types, such as conventional mortgages, federal housing authority loans, veteran's administration loans, and other similar types of personal and business loans. The automatic data flow eliminates the need to re-enter the same information in each form, and it also automatically calculates relevant field data, such as percentage rate, maximum loan, cash to or from borrower, amortization schedules, and the like. Once information is entered into each data field, e.g., borrower's name and address, of the file template during the loan origination process, the information is saved in a database wherein each data field is associated with the particular information entered. Thereafter, when a particular loan form is activated, the automatic data flow program conducts a search for each data field. Alternatively, each loan form can be modified to insert embedded codes, so that the computer program can more easily identify the location of a data field and enter the associated information.

In one embodiment, the loan broker computer system includes a loan origination software program integrated with a web-browser based interface system. The interface system couples the loan origination software program to one or more partner computers. The partners comprise loan underwriters, lenders (such as banks and finance companies), and settlement service vendors (such as appraisers, insurance brokers, and credit agencies). The interface system provides dynamic formatting and data transmission for different connections depending on the transaction type and target partner. In a web-based implementation, the interface system populates data directly from the loan origination software program to the appropriate web pages of the target partners.

Other objects, features, and advantages of the present invention will be apparent from the accompanying drawings and from the detailed description that follows below.

DESCRIPTION OF DRAWINGS

The present invention is illustrated by way of example and not limitation in the figures of the accompanying drawings, in which like references indicate similar elements, and in which.

DETAILED DESCRIPTION

A network-based loan processing system for electronic commerce is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network or a fiber or copper-based telecommunications network. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers. In some instances, the client and server functionality may be implemented on a single computer platform.

Aspects of the present invention can be used in a distributed electronic commerce application that includes a client/server network system that links one or more server computers to one or more client computers, as well as server computers to other server computers and client computers to other client computers. The client and server computers may be implemented as desktop personal computers, workstation computers, mobile computers, portable computing devices, personal digital assistant (PDA) devices, or any other similar type of computing device.

In the loan application process, a broker matches a borrower (customer) with the loan package that best suits their need. Unlike the retail loan market, in which the borrower directly inquires about loans available from a bank or commercial lender, the loan broker utilizes the wholesale loan market. In terms of a general process, the broker obtains data from the borrower and then shops for loans from the available sources in the wholesale loan market. Wholesale lenders typically work only with brokers, and take completed loan packages and underwrite them. The brokers are typically offered discounted pricing in return for the processing work performed by the broker.

In a network embodiment of the present invention, a loan broker computer is configured to access computers operated by third parties (typically in the wholesale loan market), such as lenders, loan underwriters, settlement service vendors, and other similar loan fulfillment parties through a web based interface that is integrated with a loan origination software program. The loan broker provides an on-line interface between borrowers, and those companies that will ultimately perform the loan services and provide the requested funds. During the course of the loan application process, various items of information are transmitted among the parties, including borrower information and loan application data. This information is typically maintained in databases stored in the broker computer, or on the third party computers. Different entities may be responsible for different aspects of the transaction from the lender's side. For example, one company may be involved in the processing of a loan application, while another is involved with providing the loan itself, while yet another may be involved with the billing and collection of repayment from the borrower.

The network implementation facilitates the delivery (transmission) and tracking of data and allows for the completion of electronic commerce transactions. Several different network topologies may be implemented through the use of a loan processing network system according to embodiments of the present invention. In general, the network system couples one or more lenders (banks, financial institutions, credit agencies and so on) to the loan brokers who act on behalf of potential borrowers. The loan brokers help borrowers to find and obtain loans by obtaining personal data from the borrower, searching for compatible loans from the various lenders, presenting loan selections to the borrower, and performing certain validation or screening tasks, such as pre-qualification of the borrower. The loan brokers also directly interface with the parties that will fulfill the loan or provide settlement services, such as lenders, loan underwriters, and settlement service vendors.

A broker typically keeps track of pending loans and customers through one or more pipelines. A pipeline generally refers to a list of all loans and/or borrowers that are committed and being processed by the broker. A separate pipeline, often referred to as a "pre-qualification pipeline" can be used to list prospective loans and/or borrowers who are not yet committed to a particular loan.

For purposes of the present discussion, a loan originator is any person or entity that helps to procure a loan on behalf of a borrower, and can include loan brokers, loan officers, loan processors, correspondent brokers, small banks that provide brokerage services, and any other similar type of loan procurement company or personnel. As used herein, the term "loan broker" is used to represent any such type of loan originator.

Loan brokers typically execute Loan Origination Software (LOS) programs to manage the origination tasks in the loan application process for a borrower. In one embodiment of the present invention, a processing and submission system is embedded in the broker computer system and is closely coupled to or integrated within the loan origination system program on the broker desktop. This integration serves to streamline the loan submission process and provides seamless connectivity to lenders and settlement service vendors over the network. The processing and submission system provides a direct interface to the loan origination system programs and allows efficient management and transmission of file data present in the broker loan origination software to the lender and vendor computer systems. The processing and submission system thus provides a centralized and comprehensive system for compiling the loan and borrower information, populating the loan documents with the relevant data, and submitting the completed documents to the appropriate lender and other third parties for review. This allows the broker to capture the borrower data once and publish this data to multiple lenders without having to repeatedly enter the borrower data for each loan application.

Figure 1A:
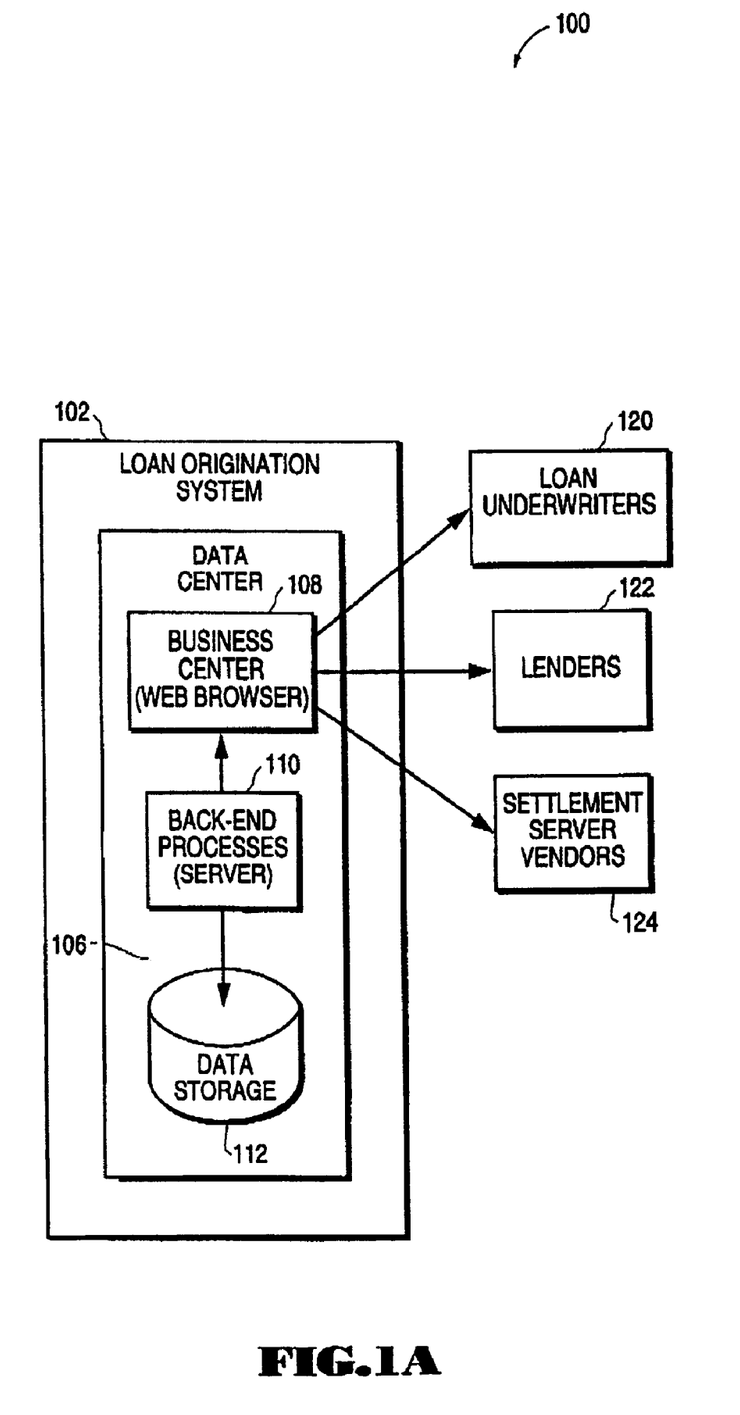
FIG. 1A illustrates a network that implements a loan processing software system, according to one embodiment of the present invention.

FIG. 1A illustrates an exemplary network system for processing loan applications, according to one embodiment of the present invention. In FIG. 1A, a loan broker computer executes several program modules that manage the loan origination process. The main module comprises a loan origination software program 102. When executed on the loan broker computer, this program comprises a system referred to as the "broker desktop environment." Integrated in the loan origination software program 102 is a web browser program that serves as a gateway to connect the desktop to a business center process 108, one or more back-end processes 110, and a data storage facility 112.

In one embodiment, the business center 108 contains a network interface that provides access between the loan origination system program and other entities. For the embodiment in which the network comprises the Internet, the interface may be a web-based interface. In this case, the business center 108 includes a web browser client process executed on the loan broker computer. In one embodiment, the web browser program is implemented using Microsoft® Internet Explorer™ browser software. The back-end processes 110 comprise the processing and submission system servers that provide downloadable program modules to the loan origination program and/or perform calculations for the loan origination program. The data storage facility 112 stores various data related to the lenders and users within the system.

The business center process 108 within the data center 106 includes the software module comprising the processing and submission system, according to embodiments of the present invention. The business center implements business and processing logic modules for receiving loan application information from a borrower (such as 1003 data for mortgage loans), storing data related to the borrower, providing interfaces to processes utilized by lenders and other third parties that fulfill and settle the loan. In this manner, the program modules required for the processing and submission system, as well as the interface to the third party entities is embedded directly within the loan origination software executed on the broker computer.

As illustrated in FIG. 1A, the loan origination system program 102 on the broker computer is coupled through the business center process 108 to loan underwriters 120, lenders 122, and one or more settlement service vendors 124. These entities perform the function of fulfilling and settling the loan application. These entities generally access the loan origination system program of the broker computer through the web browser interface of the business center 108. The business center 108 also provides facilities to set up storefront type interfaces for lenders to customize their offerings, and provides an information portal for brokers.

One or more of the loan underwriters 120 reviews the loan application and approves or denies the application. One example of a mortgage loan underwriter is the Fannie Mae company, which does not itself provide loan funds but works with lenders to assure that the funds are available. Lenders 122 are banks, savings and loans, or other financial institutions that provide the loan funds. The settlement service vendors provide services and information required to close the loan. Such vendors include appraisers, credit reporting agencies, document preparers, flood certification agencies, and the like. Other third party entities that may be interfaced to the broker computer may include loan servicers who collect monthly payments from the borrower, and other similar loan process companies.

The loan origination software system 102 utilized by the loan broker can be a proprietary system or a commercially available system. FIG. 1A illustrates an embodiment wherein the network interface (web browser) is embedded within the loan origination system program 102. For this embodiment, the loan origination system software may be a program such as Genesis™, or Contour™, which are trademarked products of Ellie Mae® Corp. In an alternative embodiment, the network interface may be closely coupled to, rather than embedded within the loan origination software.

Figure 1B:
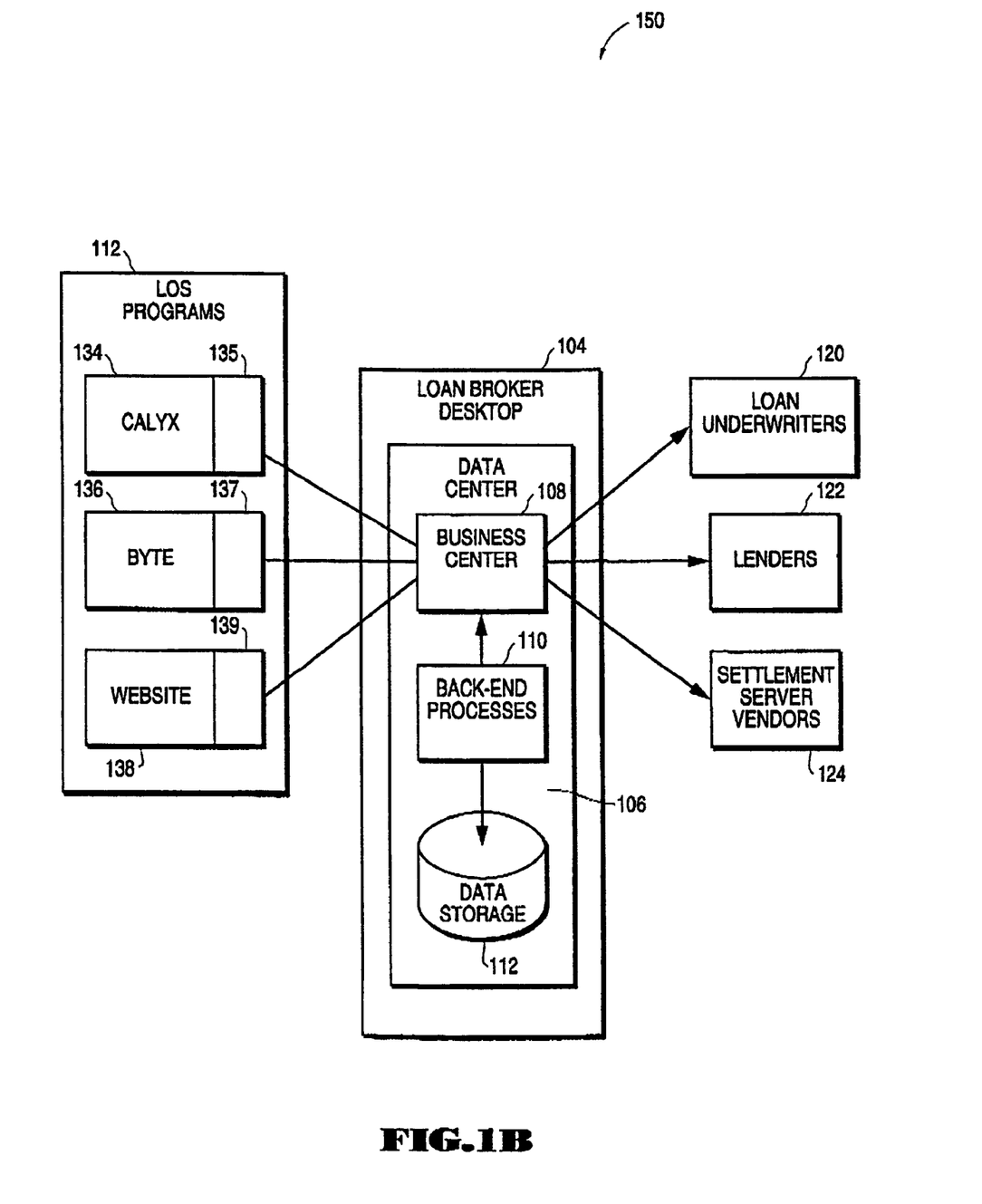
FIG. 1B illustrates a network system for processing loan applications that includes several different types of loan origination software programs that can be used with embodiments of the present invention.

FIG. 1B illustrates a network system for processing loan applications that includes different types of loan origination software programs that can be used with embodiments of the present invention. Examples of present commercially available loan origination system programs, as shown in FIG. 1B, include Calyx Point™ 134, and Byte™ 136. Alternatively, the loan broker may utilize a standard Internet web site 138 to interface with the borrower and provide some degree of loan origination software functionality. As shown in system 150 of FIG. 1B, the interface between the loan origination system 112 and the business center process may be through an adaptive interface that allows off-the-shelf products to interact with the data center 106 processes. For example, if the loan origination program is Calyx Point 134, an application programming interface (API) 135 may be used. Similarly, other loan origination programs, such as Byte, may include a dedicated adapter API 137, as well.

The loan origination system program 112 of system 150 can be included within the loan broker desktop environment of the broker computer, or it may comprise a remotely executed program executed on the broker computer or a separate networked computer.

Figure 2:
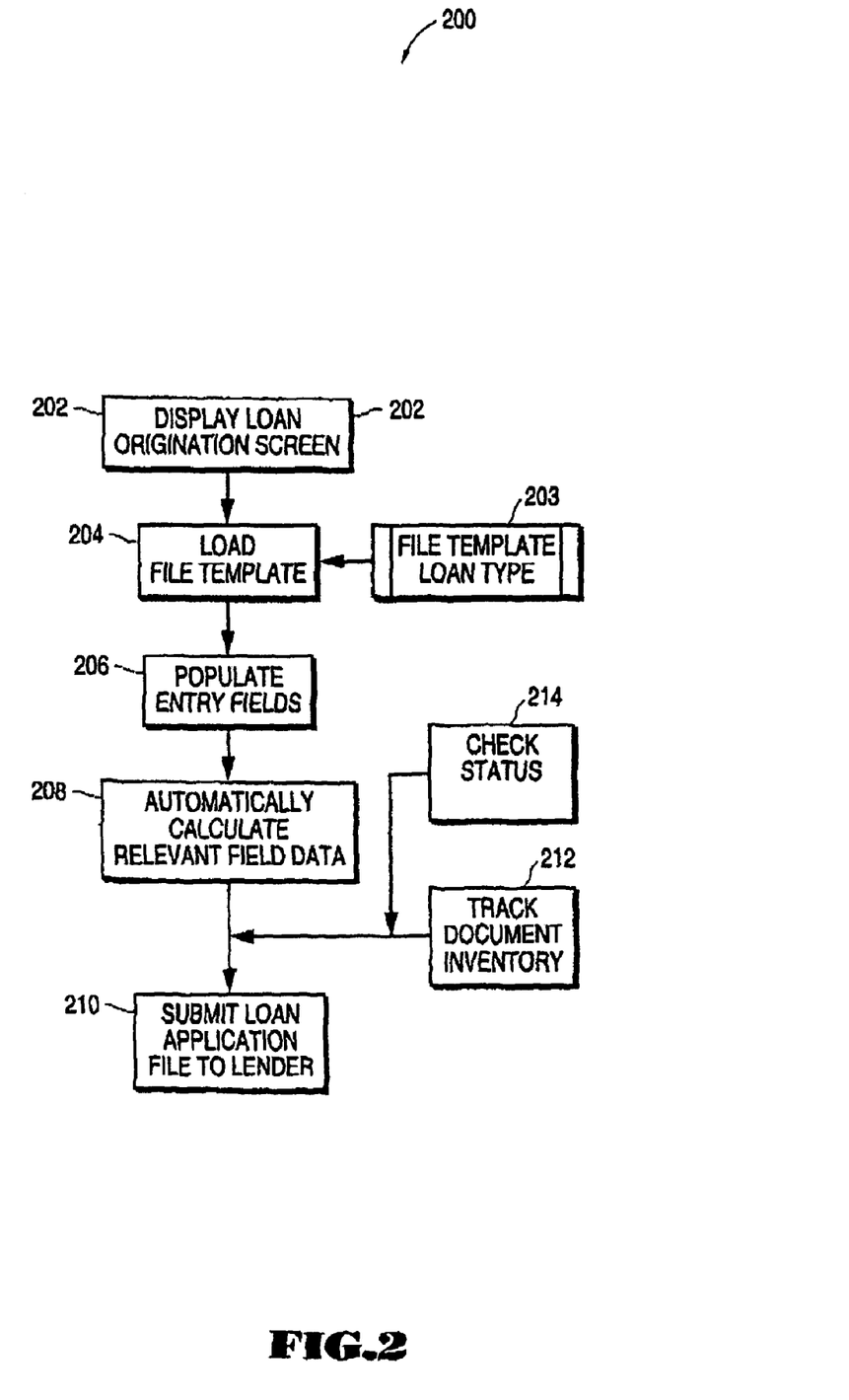
FIG. 2 is a flowchart that illustrates the general steps of processing a loan application through a loan origination software program on a broker computer, according to a method of the present invention.

Regardless of the loan origination system program used, the loan origination software allows the broker to handle various aspects of mortgage and commercial loan activities such as prequalification, origination, processing, and application management. FIG. 2 is a flowchart that illustrates the general steps of processing a loan application through a loan origination system program on the broker desktop, according to a method of the present invention. In step 202, a loan origination screen is served by the loan broker for access by borrowers over a network, and typically through a web browser interface. File templates, which serve as blank loan application forms, are then loaded and displayed to the borrower. These are loaded from a database of file templates 203 that are stored either locally on the loan broker in memory, such as data storage 112, or in a remote memory location. Various file templates can be defined for different loan types, such as conventional loans, FHA (Federal Housing Authority) loans, VA (Veterans Administration) loans, and so on.

After the borrower enters the relevant personal and loan information required by the file template and initial loan application form, the loan origination system program 102 executes an automatic data flow process, step 206, to populate the same information in all of the corresponding fields in all other documents and forms processed by the system that are related to the loan application. This includes other related bank and government forms, as well as word processing documents, spreadsheets, and any other documents with fields that are linked to the original form or other defined fields that are the same as the original fields.

The loan origination system program 102 also automatically calculates relevant field data in any of the fields of the forms that require derivation or calculation, step 208. These can include fields that calculate interest rates for given borrower profile and loan period and amount, as well as cash flow or amortization schedules, among other calculations. Once the entry field information has been populated for all of the forms and documents, and the relevant calculations have been performed, the loan application documents are submitted by the loan broker to the appropriate lenders 122 and other third parties. Depending upon the interface between the lenders to the processing and submission process in business center 108, the loan information is input into the lender computer systems in a relatively seamless manner. For example, if the interface between a lender and the broker is web-based, such as the Freddie Mac Loan Prospector system, the information is populated directly into the lender web forms. This automated input and distribution system eliminates the need to fill out individual disparate loan application forms, and transmit the forms to the various broker and lender sites.

Throughout the process, a document inventory tracking process 212 can be used to search and track documents within the system using many different types of searchable criteria, such as borrower name, loan number, data, and so on. An on-line status checking process 214 can also be included that provides loan application status to borrowers. In one embodiment, the document tracking and status checking processes may be implemented to work in conjunction with an electronic mail process to automatically communicate desired information to a borrower.

In one embodiment of the present invention, the processing and submission system within the business center 108 utilizes program modules served by the back-end process (server) 110. The program modules may be compiled programs, downloadable script files, or other similar type of executable program. These program modules are either directly executable by the back-end process or can be downloaded to the desktop environment for local execution. In one embodiment, the modules comprise XML to (Extended Markup Language) in combination with VBScript (Visual Basic Script) to implement loan originator independent e-commerce transactions.

In one embodiment, the broker computer is coupled to the third party entities and/or the potential borrowers over the Internet network through a web-based interface. For this embodiment, the loan originator software program 102 executes an embedded web browser program within business center 108, which is integrated with the loan origination program 102 through a program such as Microsoft Internet Explorer™ or Netscape Navigator™. The business center process 108 effectively integrates Internet and web-based functionality to the loan origination program 102. The processing and submission module allows the loan originator to track user clicks on a web page, and call local programs, and allows for convenient switching between the loan broker computer and the Internet. The processing and submission module primarily serves to download map files from a server, present a loan selection panel (pipeline), and perform the form population of the loan applications on demand. The processing and submission module also allows for downloading of program modules to complete a transaction. For example, a DLL (Data Link Layer) object for a particular credit vendor can be downloaded to the user on request. Other tasks performed by module include performing client-side posts (e.g., HTTPS Post) to submit files to servers, receiving credit reports, presenting a message list for incoming server messages, and centrally tracking transactions on a server.

In one embodiment, the processing and submission module also includes an inbox sub-module that allows a loan broker to obtain web-based applications from the loan origination system. With this module, a loan application can be automatically imported into the loan origination software program. This process also allows brokers to access loan files sent from other brokers or branches, and receive various reports and certificates. The inbox sub-module also provides a history of transaction reports, and it provides a mechanism for two-way communications. For example, a broker web site can send updated loan application data to the inbox module, and the loan origination system can update the borrower file automatically.

In one embodiment, the business center module 108 provides various operational functions to the loan origination system 102. These include providing marketing information and messages to the broker, allowing lender 122 and vendor 124 selections, providing an information portal for the broker, and customizing the processing and submission module for use by the particular broker.

The processing and submission server system illustrated in FIGS. 1A and 1B uses the Secure Sockets Layer (SSL) protocol when transmitting data between client and servers. The transfer of data between clients and server is based on an open and expandable file format with no restriction or limitation on the type or amount of data. The server-side modules executed by the loan origination system 102 are typically all Microsoft ASP (active server pages) and COM (component object model) modules, and new modules can be developed and added to the system depending upon actual implementation requirements or constraints. As stated above, the client-side of the processing and submission system is implemented through a web browser over an Internet link. This provides a familiar user interface for the client. Instructions for different tasks are presented to the users in HTML (Hypertext Markup Language) files, and communication between clients and server is HTTP-based. For this embodiment, forms and status data to the clients (users) can be submitted in PDF/plain text format. Although HTML messages can be added, certain forms, such as mortgage forms are standardized and must be printed in the exact size and format required by regulations. In this case, PDF is often the best way to transfer form data (for example, sending the Good Faith estimate and Truth in Lending Disclosure to the borrowers). The borrowers can then use client-side software, such as the electronic mail-based MortgageMail service to view their Messages.

The processing and submission system illustrated in FIGS. 1A and 1B includes file templates that are utilized during loan origination. This allows for relevant loan information to need be entered only once, and not several times for each different form that uses the same information. An automatic data flow process from the origination screen populates the relevant fields in all of the other loan forms and word processing documents. Forms are supported for several loan types, which include conventional mortgages, FHA (Federal Housing Authority) loans, VA (Veterans Administration) loans, and other types of loans. This automatic data flow eliminates the need to re-enter the same information per form, and also automatically calculates relevant field data, such as interest rates, maximum loan amounts, cash to or from borrower, amortization schedules, and the like.

Once information is entered into each data field, e.g., name and address, of the file template during the loan origination process, the information is saved in a database, wherein each data field is associated with the particular information entered. In one embodiment, the database may be saved in the data storage facility 112 coupled or included within the loan broker computer. When a particular loan form is activated, the automatic data flow program conducts a search for each data field and inserts the associated information from the database into the correct position located for the data field. Alternatively, each loan form can be modified to insert embedded codes, so that the computer program can more easily identify the location of a data field and enter the associated information.

The loan origination system program 102 can be configured to export loan data to different popular formats such as Freddie Mac, Fannie Mae, and Ellie Mae proprietary format. Once the loan data has been exported, it can easily be submitted to the broker computer and from the broker computer to other third parties, such as lender 122.

For embodiments in which the loan originator executes a web browser interface to the processing and submission server, specific loan originator request forms can be loaded into the processing client module. In this manner, the forms can be populated with loan data that is already entered into the loan origination system, so that the broker does not need to re-enter the data.

In one embodiment, HTTP (hypertext transport protocol) links are inserted into the HTML (hypertext markup language) pages served by the broker computer. When these links are selected by a user, the information contained in the URL instructs the local processing client how to process the link and what kind of information to submit with the link to the link's destination. For this embodiment, the system may incorporate Internet standard protocols by embedding a web browser program in the broker computer and adopting web standards, such as XML and VBScript. When a web browser is integrated into the loan origination client system, its behavior is fully controlled and customized by the programs provided by the broker computer. Communication with the server is based on HTTPS (secure HTTP) protocol to transfer data between client and server. In one embodiment, the format of the data transferred between client and server is based on an Ellie Mae XML file and Fannie Mae Desktop Underwriter (DU) 3.0 file.

This embodiment provides a seamless Internet interface to the loan origination system client desktop 102. This results in an easy to use transaction platform that is robust and fully integrated with the loan originator and enables two-way communications so that brokers can receive credit reports, underwriting decisions, and flood and title certificates within the loan origination system context. The business center 108 interface provides brokers with a single point of access from their loan origination systems 102 to the underwriter, lenders, and settlement service providers, thus streamlining the information data flow and simplifying the task of importing files among the different parties and programs.

The processing and submission system within the business center 108 includes multiple entry points. A loan application and processing transaction on the broker computer can be initiated by launching the loan origination program 102, e.g., by launching the Genesis or Contour program on the broker computer desktop. Alternatively, it can be entered through the web browser interface by a partner computer, e.g., a computer operated by lender 122. For this embodiment, the broker computer hosts a web page that is accessible through a URL (Uniform Resource Locator) address maintained by the broker computer.

Figures 3, 3A:
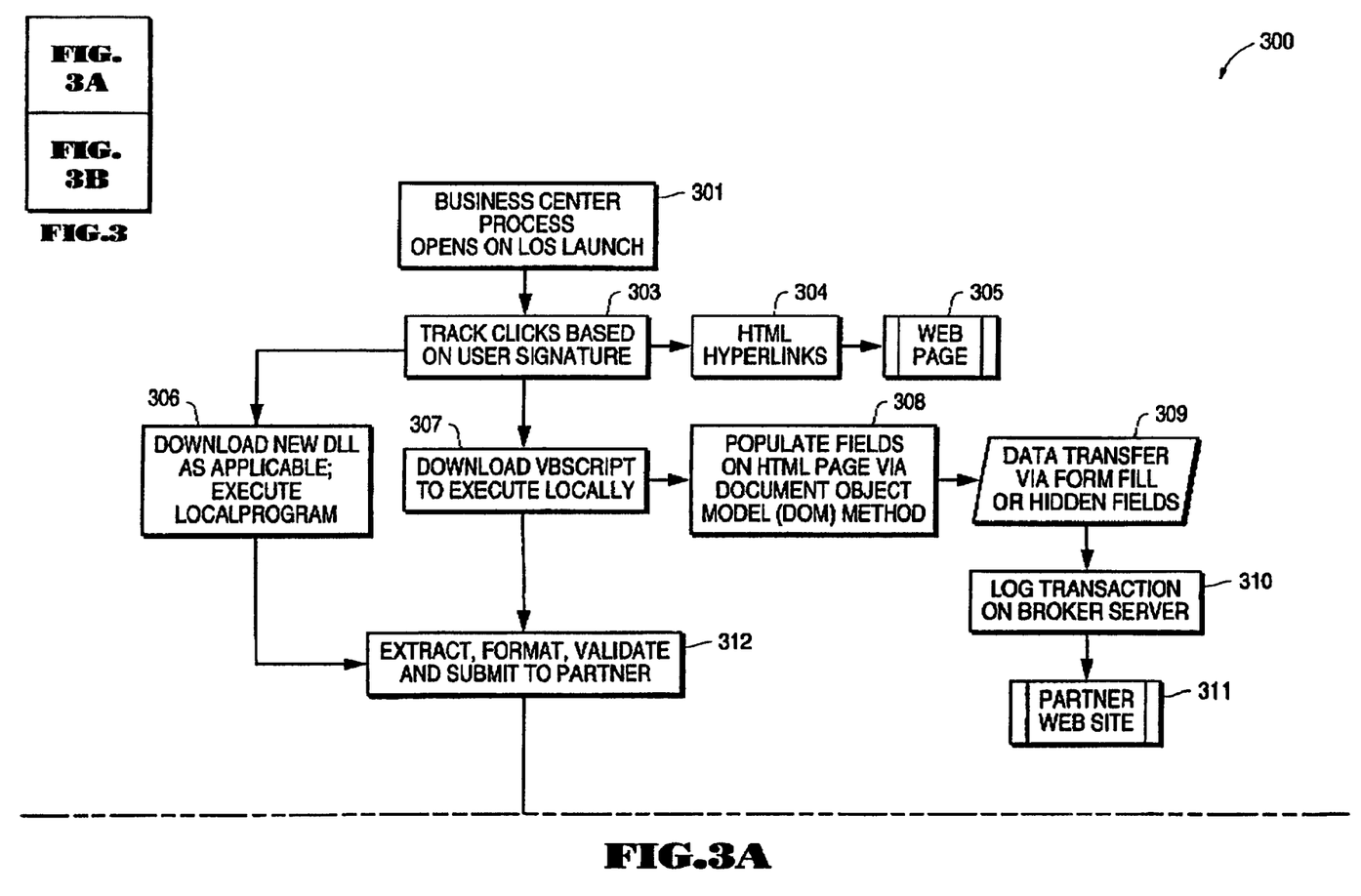
FIGS. 3A and 3B are a flowchart illustrating the steps of processing and submitting a loan application through a loan application processing and submission system, according to one embodiment of the present invention.
Figure 3B:
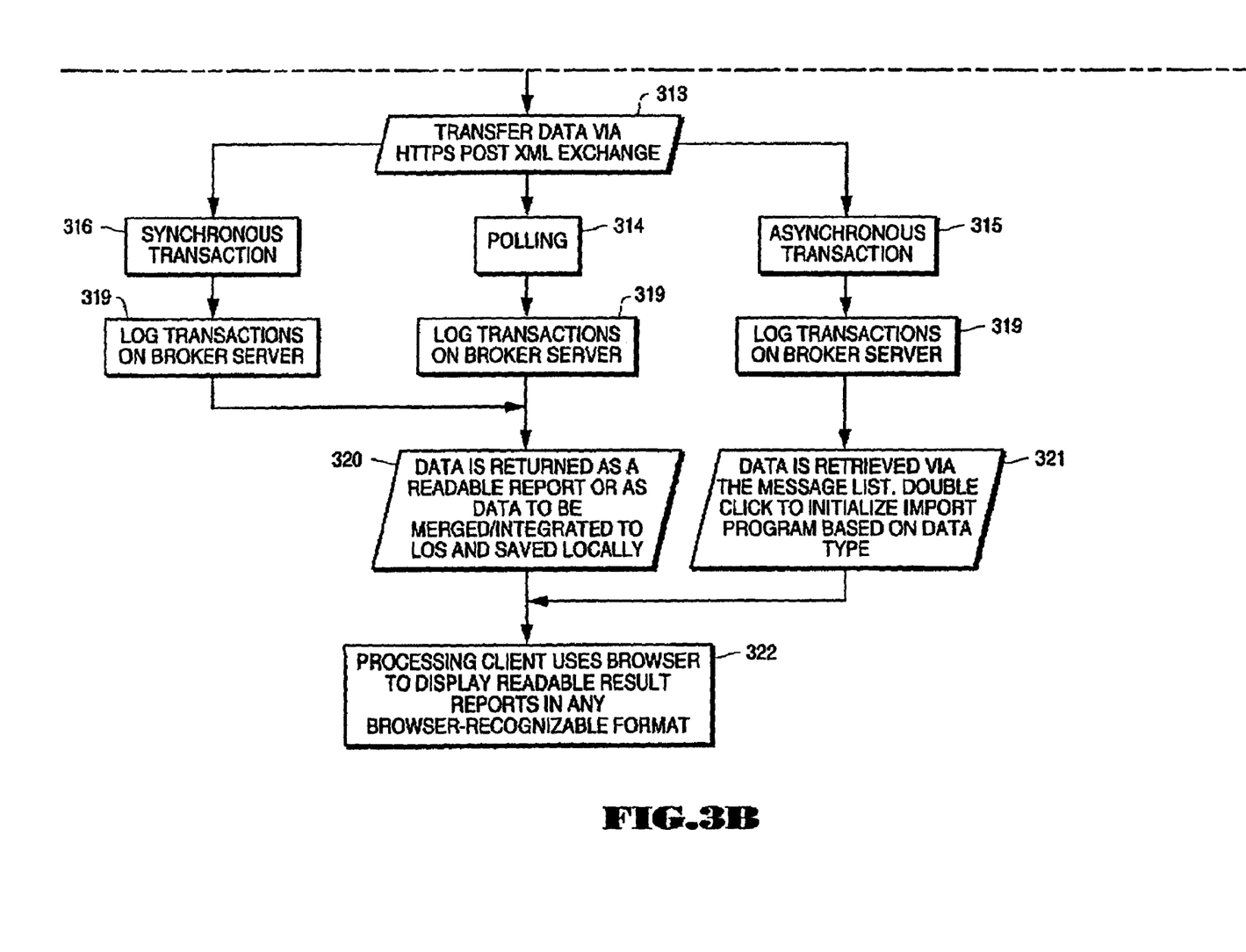

FIGS. 3A and 3B are a flowchart illustrating the steps of processing and submitting a loan application through a loan application processing and submission process, according to one embodiment of the present invention. In step 301 of process 300, the business center process 108 that is embedded within the broker server 104 opens upon the launch of the loan origination program 102 from the broker desktop, or from a partner computer. The business center application provides lender and loan vendor information and store front displays to the user and acts as a general information portal between the broker and the partners, such as underwriter 120, lender 122, and vendors 124. Based on the signature of the loan broker, the navigation clicks from the user are tracked by the processing and submission module. If HTML hyperlinks are selected by the user, the appropriate web page 305, typically on a partner web site, is accessed, step 304. The loan form templates are then downloaded. In one embodiment, the processing client downloads the form templates as a new DLL (data link layer) object, and executes the local processing program, step 306. Alternatively, the processing client 114 executes a VBS script process that is executed locally, step 307. If the VBS script process is used, the fields on the HTML page representing the application form is populated using a Document Object Model (DOM) method, step 308. The data input by the borrower is then transferred to the appropriate partner computer using form fill or hidden field techniques, step 309, and the partner web site 311 is accessed over the network. In step 310, the transaction is logged and stored in the data center 104.

In one embodiment of the present invention, the form fill technique is an intelligent process executed by the broker desktop 104 that formats and transfers the data based on the recognition of defined field names in the object model or the HTML structure of the application form. For example, fields can be defined for name and address, and upon processing of the form, the data associated with these fields is automatically searched and transferred and passed to the HTML web page in the browser. The hidden field technique utilizes hidden fields defined in the partner web page or other customer form entry point. These hidden fields are used to trigger the formatting and transmission of data within the appropriate fields of the application form. Thus, the partners define hidden fields (e.g., on their web pages) to receive the loan application and other data from the broker desktop.

Once the DLL or VBScript is downloaded, the data input into the loan application form template or templates by the borrower is extracted, formatted, validated and then submitted to the partner, step 312. The validation of the data can be performed by the loan broker desktop 104 or by a separate validation process within the back-end processes 110.

As shown in step 313, for a standard Internet implementation, the data is transferred from the broker server 104 through an HTTPS XML exchange, although various other data transfer protocols are also possible. The data transfer executed in step 313 can be one of three types, synchronous 316, asynchronous 315, or polling driven 314. All data transactions are logged and stored on the broker server 102, step 319. For an asynchronous transaction 15, the data is received through a message list, step 321. In this step, the import program is initialized based on data type. The processing client 104 then uses the resident web browser to display the readable result reports in a browser recognizable format, step 322. Examples of web browser formats include .txt, .pdf, .htm, .doc files, and so on.

For data transactions that are either synchronous 316 or polling-based 014, the data is returned as a readable report or as data to be integrated to the loan originator and saved locally by the client process 114, step 320. After this, the processing client 104 then uses the resident web browser to display the readable result reports in a browser recognizable format, step 322.

Figure 4:
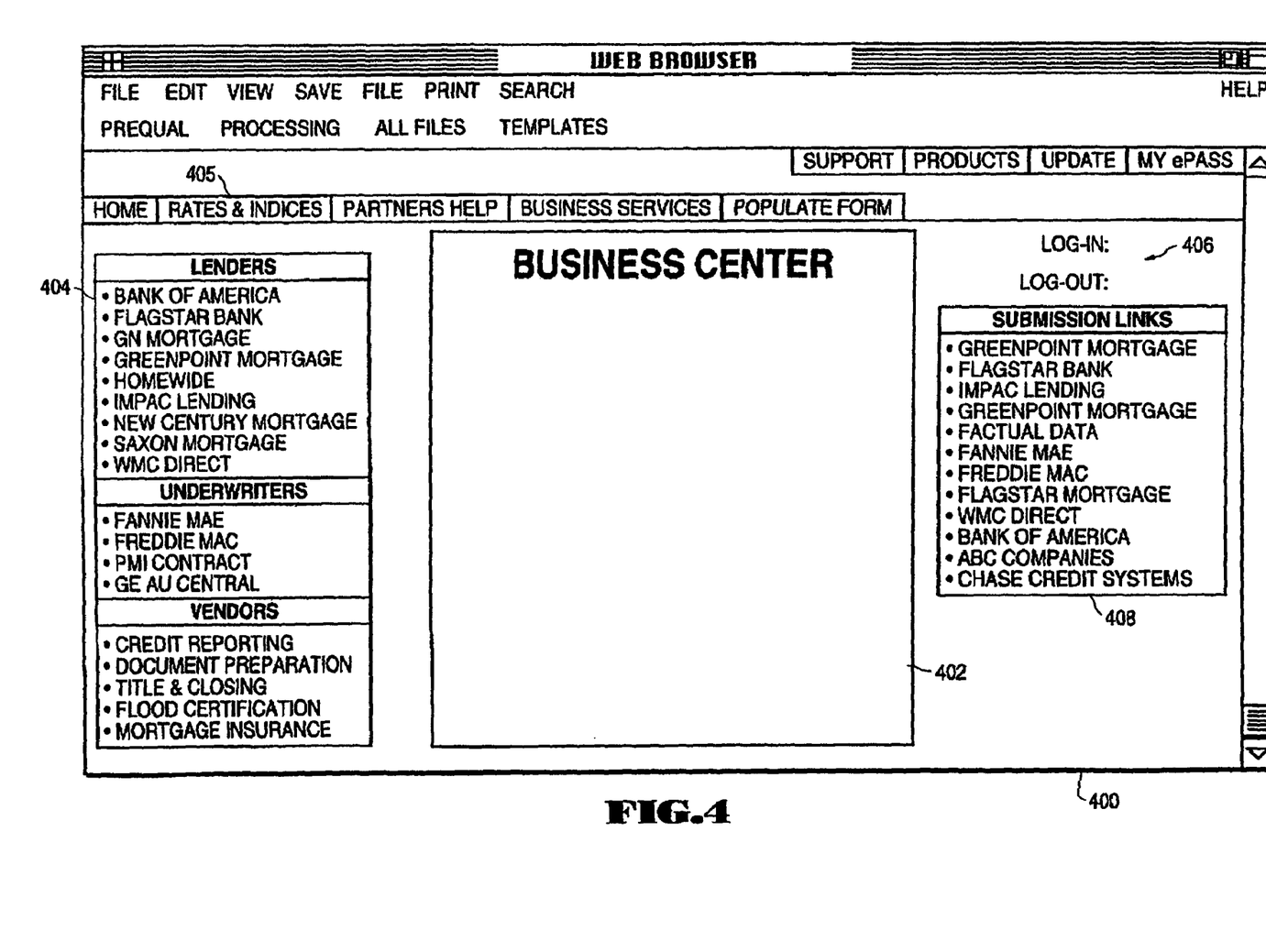
FIG. 4 is an exemplary web page for a business server process, according to one embodiment of the present invention.

In one embodiment of the present invention, the business center process 108 provides an embedded web browser interface to the loan origination program 102 resident on the broker computer. FIG. 4 is an exemplary web site home page for the business server process, according to one embodiment of the present invention. The business center web page 400 includes several display buttons that allow the user to access various parts of the web site and execute different processes within the system. The main text display area 402 displays various items of information related to the business center. A partner link area 404 provides HTML links to various partner web sites. For example, partner lenders may include banks and finance companies, such as Bank of America, Flagstar Bank, GM Mortgage, and so on. The loan underwriters can include Fannie Mae, Freddie Mac, PMI Contract, GE AU Central, and so on. The links in the vendor section of display area 404 include links to various settlement service vendors, such as credit reporting, title and closing companies, mortgage insurance companies, and so on.

The business center web page 400 also includes an account login display area 406 that allows a user to log into and out of the business center system. The system can be configured to manage separate accounts for different users and save user profiles and preferences for ease of use. A submission links window display area 408 includes a list of links to pre-defined or often accessed partner cites.

As shown in FIG. 4, various other command buttons on the business center web page 400 allow the user to access various processes. For example, the user can shop for different loans based on interest rates and indices using option button 405 on web page 400. This provides access to a separate web page that allows the user to find and compare various loans based on information provided by the user.

Figure 5:
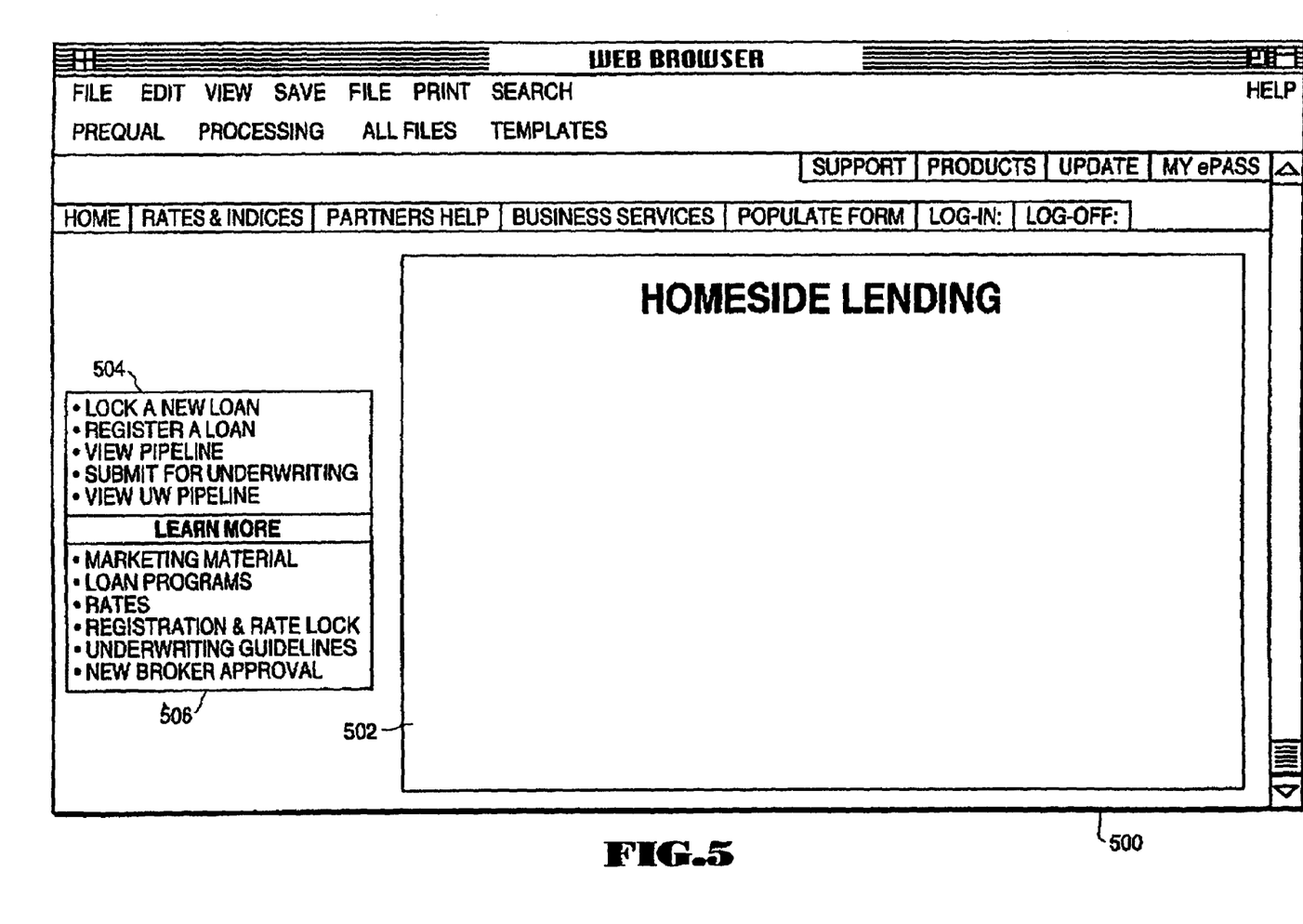
FIG. 5 is an exemplary storefront web page for a lender partner, according to one embodiment of the present invention.

Accessing a partner web site through a link provided in the business center web page redirects the embedded or resident web browser on the broker computer to the appropriate partner home page. As stated above, the business center 108 provides facilities to set up storefront type interfaces for lenders to customize their offerings. FIG. 5 is an exemplary web site home page for a lender partner, according to one embodiment of the present invention. As illustrated in FIG. 5, an exemplary home page 500 for Homeside Lending is shown. This web page is accessed by the user clicking on the "Homeside" link in the lenders portion of link display area 404. The main display area 502 is typically used to displays high-level information regarding the lender, and provide navigation links and instructions to other pages in the web site. The home page 500 includes a display area 504, which allows the user to specify one or more actions to perform. These include locking a rate for a new loan, registering a loan, viewing the broker pipeline, submitting a loan application for underwriting, and viewing an underwriting pipeline. Also provided is a display area 506 that provides links to pages that provide descriptive information for the processes available through the lender web site. Similar web pages are provided for the other partner web sites accessible from the business center process.

Figure 6:
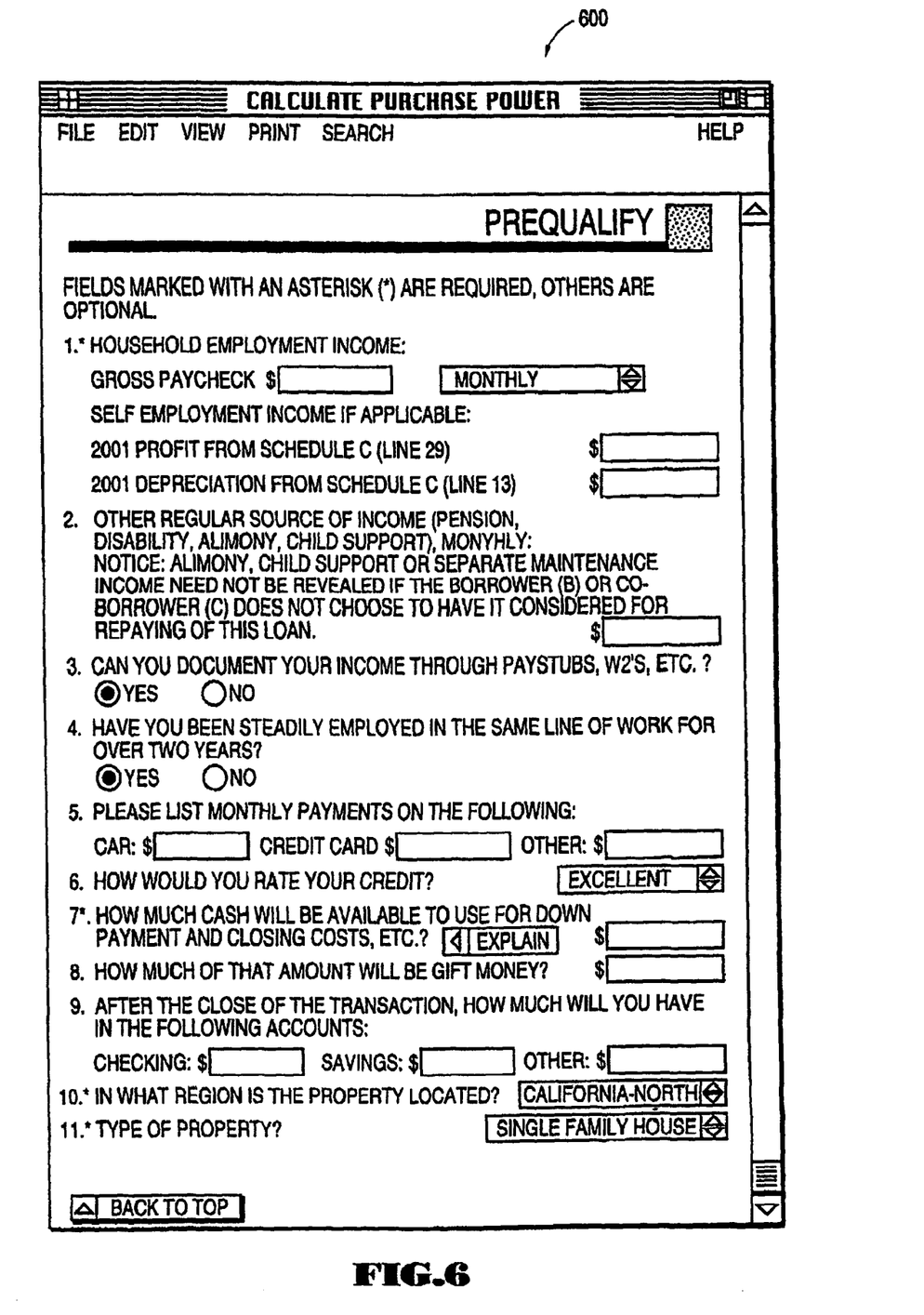
FIG. 6 illustrates an exemplary pre-qualification web page, according to one embodiment of the present invention.
Figure 7:
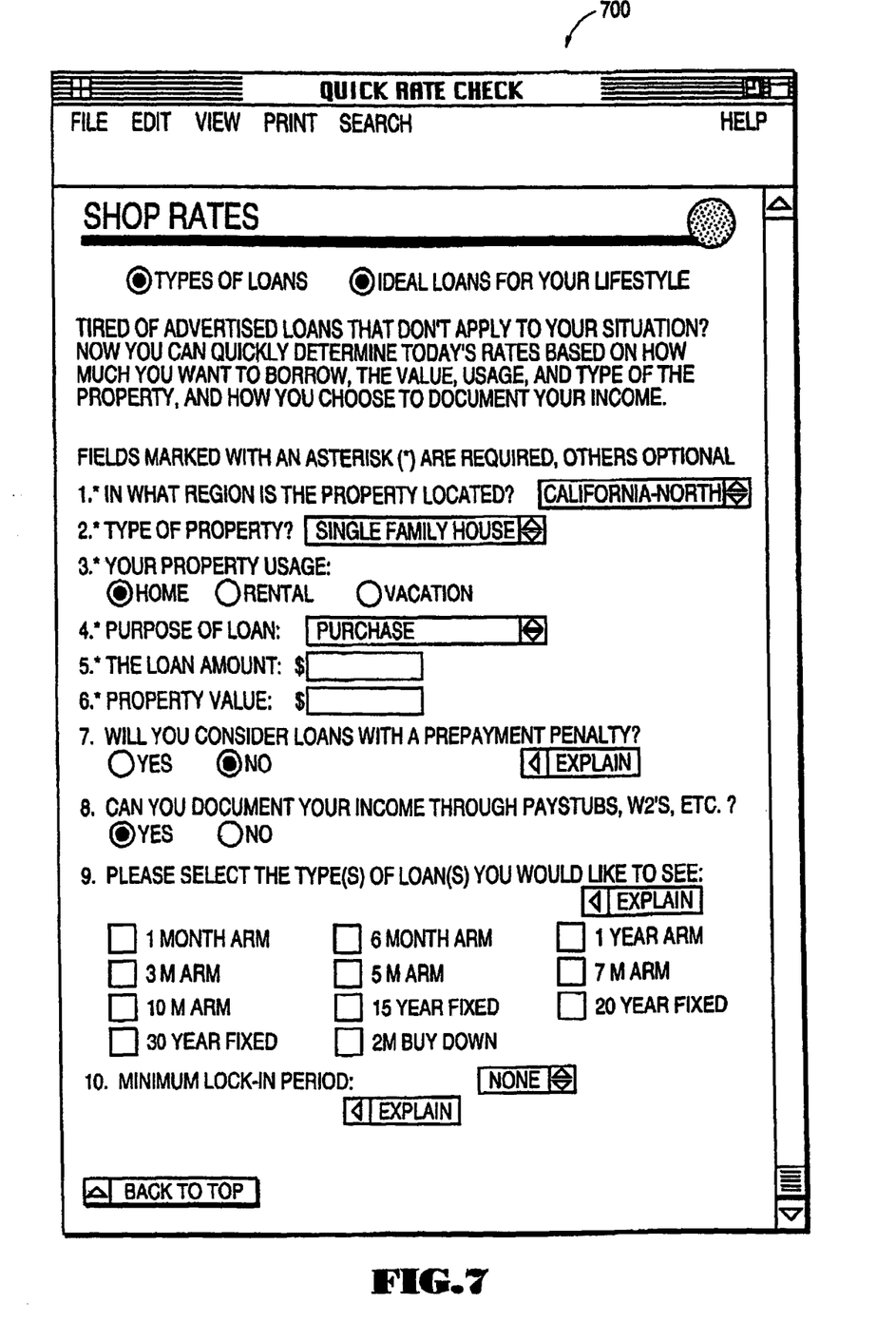
FIG. 7 illustrates an exemplary loan shopping web page, according to one embodiment of the present invention.

In one embodiment of the present invention, the processing and submission system includes an interface to the consumer (borrower). This can be implemented through a user interface, such as web site 138 in FIG. 1B. This interface allows the consumer to provide certain data, such as 1003 data to the loan origination system program 102. Various different forms can be presented to the user to provide data entry fields. For example, FIG. 6 illustrates an exemplary pre-qualification web page, according to one embodiment of the present invention. This web page prompts the user for certain items of information and determines if the borrower prequalifies for the preselected loan or loans. FIG. 7 illustrates an exemplary loan shopping web page that prompts the user for certain items of information and finds loans available to the user based on the information. The data entered by the borrower is processed by the processing and submission system and used to populate all of the forms utilized by the partners 120, 122, and 124.

In an alternative embodiment, the borrower interfaces, such as those illustrated in FIGS. 6 and 7 may be provided by a partner web site, such as by a lender 122. In this case, a partner provides the consumer web interface for the broker, and the form data is populated from the partner data.

It should be noted that the web pages illustrated in FIGS. 4, 5, 6, and 7 are primarily intended for illustration, and that the layout and content of the web pages served by the systems 100 and 150 can vary depending upon implementation choices by the lenders and/or loan originators. Furthermore, a wide variety of web pages can be provided for other aspects of the loan application process and the links illustrated in the Figures.

Although embodiments of the present invention have been described with reference to a network implementation comprising the Internet and Internet-related web browsing and web serving technologies, it should be noted that alternative embodiments of the present invention can be implemented on many other types of networks and network protocols, such as proprietary protocols for local area networks, wide area networks, and any combination thereof.

The present invention has been described primarily in relation to loan applications for personal home mortgage loans. It should be noted, however, that many other types of loans can be processed through the embodiments described herein, such as commercial loans, any type of personal loan, home equity loans, and the like.

In the foregoing, a system has been described for processing and submitting loan applications through an embedded loan origination software system and loan processing interface system. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for the formatting and transmission of data from a loan originator computer to one or more partner computers, the method comprising:
   providing a loan origination software program resident on a loan originator computer including a native web browser, formatting and transmitting capability embedded in the loan origination software program;
   formatting including re-formatting and publishing loan application information provided by the loan origination software program in a format compatible with a financial service software program of a target partner computer of the one or more partner computers; and
   transmitting re-formatted loan application information to the target partner computer.

2. The method of claim 1 wherein the target partner computers comprises at least one of the following, a lender computer, an underwriter company computer, or a settlement service vendor computer.

3. The method of claim 1 further comprising receiving one or more modules for processing the loan application information wherein the processing includes formatting the loan application information.

4. The method of claim 3 wherein the one or more modules comprises an instruction script downloaded from a server process for local execution by the native web browser embedded in the loan origination software program.

5. The method of claim 1 further comprising validating the loan application information prior to transmission to the target partner computer.

6. The method of claim 1 wherein transmitting the re-formatted loan application information to the target partner computer includes a transmission selected from the group consisting of synchronous transmission, polling-based transmission, or asynchronous transmission.

7. The method of claim 1 further comprising logging results of the transmitting step in a memory functionally coupled to the native web browser embedded in the loan origination software program.

8. The method of claim 1 further comprising receiving return information from the target partner computer and displaying the return information in a format compatible with the native web browser embedded in the loan origination software program.

9. The method of claim 1 further comprising receiving return information from the target partner computer and merging the return information with the loan application information.

10. A non-transitory computer program product including instructions stored on a tangible medium, the instructions when executed configured to:
    provide a loan origination software program that is to be resident on a loan originator computer, the loan origination software program including a native web browser, formatting and transmitting capabilities embedded in the loan origination software program;
    format including re-formatting and publishing loan application information provided by the loan origination software program in a format compatible with a financial service software program of a target partner computer; and
    transmit re-formatted loan application information to the target partner computer.

11. A loan origination apparatus comprising:
    a formatter for re-formatting and publishing loan application information associated with the loan origination apparatus in a format compatible with a financial service software program of a target partner computer and a native web browser;
    a transmitter that transmits re-formatted loan application information to the target partner computer; and
    a loan origination module including the native web browser, the loan origination module receiving return information from the target partner computer and displaying the return information in a format compatible with the native web browser.

12. The apparatus of claim 11 wherein the target partner computer comprises at least one of the following, a lender computer, an underwriter company computer, or a settlement service vendor computer.

13. The apparatus of claim 11 further comprising one or more modules for processing the loan application information wherein the processing includes formatting the loan application information, the one or more modules received from an external source.

14. The apparatus of claim 13 wherein the one or more modules comprises an instruction script downloaded from a server process for local execution by the native web browser.

15. The apparatus of claim 11 further comprising a validation engine that validates the loan application information prior to transmission to the target partner computer.

16. The apparatus of claim 11 wherein the transmitter transmits the loan application information to the target partner computer by means selected from the group consisting of synchronous transmission, polling-based transmission, or asynchronous transmission.

17. The apparatus of claim 11 further comprising a logging engine that logs results of the transmitter in a memory functionally coupled to the native web browser.

18. The apparatus of claim 11 wherein the loan origination module further comprising a receiver that receives return information from the target partner computer and merges the return information with the loan application information.

19. A method for processing loan application data, the method employing a loan origination software program with the native web browser capability, the method comprising:

accepting user specified data for one or more of user input fields of a file template, the file template corresponding to a document within a loan application;

automatically, by the loan origination software program, entering the user specified data into one or more corresponding user input fields in another file template that includes the one or more of user input fields of the file template;

calculating data entries for the one or more corresponding user input fields in the another file template that depend on data from the one or more of user fields of the file template; and transmitting the another file template containing the user specified data associated data entries to a target partner computer, the another file template being transmitted in a transmission format different from a format of the accepted user specified data.

20. The method of claim 19 wherein the loan application comprises an on-line version of a loan application package available from a partner associated with the target partner computer.

21. The method of claim 19 further comprising storing the user specified data in a memory coupled to a loan originator computer.

22. The method of claim 19 wherein the file template is selected from the group of document types consisting of word processing documents, commercially formatted loan application documents, government specified loan application documents or spreadsheet program documents.

23. The method of claim 19 wherein the loan application is selected from the group consisting of federal housing authority loan, veterans administration loan, or conventional mortgage loan.

24. The method of claim 19 further comprising determining a type of loan a user is interested in obtaining to establish a desired loan;

performing a pre-qualification analysis of the user in relation to the desired loan; and providing to the user a list of one or more partners who can provide the desired loan.

25. The method of claim 19 further comprising establishing an account for a user upon transmission of the another file template containing the user specified data to the target partner computer;

storing the user specified data; and using the stored user specified data to compile a profile for the user.

26. The method of claim 25 further comprising automatically entering the user specified data into corresponding user input fields in any subsequent file templates provided to the user based on the profile for the user stored in a memory.

27. The method of claim 19 further comprising tracking the one or more completed file templates transmitted to the partner computer;

checking a status of an existing loan application; and logging a loan application transaction in a memory.

* * * * *

UNITED STATES PATENT AND TRADEMARK OFFICE
CERTIFICATE OF CORRECTION

PATENT NO. : 8,364,579 B2  
APPLICATION NO. : 12/259247  
DATED : January 29, 2013  
INVENTOR(S) : Limin Hu, Babak Khanpour and Ting-Hu Wu Page 1 of 1

It is certified that error appears in the above-identified patent and that said Letters Patent is hereby corrected as shown below:

In the Claims:

Column 14, line 67, in claim 19, before "native", delete "the";

Column 15, line 11, in claim 19, after "user", insert --input--; and

Column 15, line 14, in claim 19, after "data", insert --and--.

Signed and Sealed this  
Fourteenth Day of May, 2013

Teresa Stanek Rea  
*Acting Director of the United States Patent and Trademark Office*